US008274734B2

(12) United States Patent
Cook

(10) Patent No.: US 8,274,734 B2
(45) Date of Patent: Sep. 25, 2012

(54) ANAMORPHIC RELAYED IMAGER HAVING MULTIPLE ROTATIONALLY SYMMETRIC POWERED MIRRORS

(75) Inventor: Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 97 days.

(21) Appl. No.: 12/901,294

(22) Filed: Oct. 8, 2010

(65) Prior Publication Data

US 2012/0087028 A1 Apr. 12, 2012

(51) Int. Cl.
*G02B 17/00* (2006.01)
(52) U.S. Cl. ........................................ 359/365; 359/858
(58) Field of Classification Search .................. 359/364, 359/365, 857, 858, 861; 355/52, 67
See application file for complete search history.

(56) References Cited

U.S. PATENT DOCUMENTS

| | | | | |
|---|---|---|---|---|
| 4,805,998 A * | 2/1989 | Chen et al. | ..................... | 359/670 |
| 5,694,250 A * | 12/1997 | Anderson | ..................... | 359/631 |
| 6,022,114 A * | 2/2000 | Foo | ............................... | 359/853 |
| 6,459,530 B2 * | 10/2002 | Nanba et al. | ................... | 359/365 |
| 6,842,280 B2 * | 1/2005 | Araki et al. | ................... | 359/365 |
| 6,902,282 B2 | 6/2005 | Cook | | |
| 6,984,044 B2 * | 1/2006 | Kurioka et al. | ................. | 353/99 |
| 7,046,338 B2 * | 5/2006 | McGuire | ......................... | 355/67 |
| 8,194,230 B2 * | 6/2012 | Chan et al. | ....................... | 355/57 |
| 2003/0202161 A1 * | 10/2003 | Konno et al. | .................... | 353/70 |
| 2004/0150879 A1 * | 8/2004 | Araki et al. | .................... | 359/365 |
| 2011/0299184 A1 * | 12/2011 | Williamson et al. | .......... | 359/858 |
| 2012/0038812 A1 * | 2/2012 | Neil | .............................. | 348/340 |

FOREIGN PATENT DOCUMENTS

FR 1111830 A 3/1956
JP 10010428 A 1/1998

OTHER PUBLICATIONS

European Search Report dated Dec. 19, 2011 for Application No. EP 11 17 6541.
Howard et al., "Anamorphic imaging with three mirrors: a survey," Proceedings of the SPIE, Jan. 1, 2010, pp. 76520K-76520K-7.

* cited by examiner

*Primary Examiner* — Frank Font
(74) *Attorney, Agent, or Firm* — Lando & Anastasi, LLP

(57) ABSTRACT

Various embodiments provide an optical system including a plurality of mirrors, each mirror having a rotational axis of symmetry; and a detector configured to detect an image formed by the plurality of mirrors. The plurality of mirrors are configured to scan an object space along a first direction. The plurality of mirrors are configured and arranged so that a focal length of the plurality of mirrors along the first direction is greater than a focal length of the plurality of mirrors in a second direction perpendicular to the first direction so as to obtain a ratio of anamorphism greater than approximately 1.5.

17 Claims, 3 Drawing Sheets

ANAMORPHIC RELAYED IMAGER HAVING MULTIPLE ROTATIONALLY SYMMETRIC POWERED MIRRORS

BACKGROUND

This disclosure pertains to optical imagers and in particular to an anamorphic relayed imager having multiple rotationally symmetric powered mirrors.

Demand for imaging systems that provide wide area surveillance is increasing. Wide area surveillance can be performed at an elevated position relative to ground surface. Wide area surveillance can be used in various applications such as, for example, on an unmanned aerial vehicle (UAV) platform, an aircraft, or a satellite for target recognition. Wide area surveillance can be performed at various wavelength ranges depending on the desired application. The wavelength ranges of interest include short wavelength infrared radiation (SWIR) in the wavelength range between approximately 1 μm and 3 μm, mid wavelength infrared radiation (MWIR) in the wavelength range between approximately 3 μm and 5 μm, and long wavelength infrared radiation (LWIR) in the wavelength range between approximately 8 μm and 12 μm.

Imaging systems use an image sensing device for sensing radiation collected by a series of imaging optics including one or more lenses, one or more mirrors, or both. Typically, the image sensing device is a focal plane array (FPA), which includes an array or matrix of radiation sensing pixels, positioned at a focal plane of the optics.

Conventional FPAs generally include square pixels such that when used with conventional optical systems, a square ground sample distance (GSD) or footprint is projected when viewing an object at or near nadir from an elevated position, i.e., when viewing nearly straight down at an angle of approximately 0 deg. relative to nadir direction from a viewing platform (e.g., a UAV, a satellite, etc.). However, when viewing at an angle that is extremely off-nadir (e.g., approaching the local horizon), the square angular subtense of the square FPA pixel becomes elongated in the elevation direction to an extreme rectangular GSD or footprint. This effectively reduces the resolution of the EPA sensor in that direction. For example, when viewing at an elevation angle of approximately 45 deg. from nadir direction, the elevation GSD is double the elevation GSD when viewing at nadir direction (assuming a flat earth surface). When viewing at an elevation angle of approximately 60 deg. from nadir direction, the elevation GSD is quadruple the elevation GSD when viewing at nadir direction (assuming a flat earth).

In order to limit the impact on resolution for viewing at greater angles from the nadir direction, a focal length of the imaging optics is approximately doubled in the along-scan (A-S) or elevation direction relative to a focal length in the cross-scan (C-S) direction perpendicular to the A-S direction. In this way, the angular subtense of the FPA square pixel is halved (divided by two) in the A-S direction. As a result, a smaller GSD can be maintained at large viewing angles from nadir direction. The difference in focal length between a plane in the imaging optics in the A-S direction and a plane in the imaging optics in the C-S direction is termed anamorphism. Most conventional optical systems have little or no anamorphism.

Conventional optical systems that exhibit any useful degree of anamorphism do so by using cylindrical surfaces on mirrors, lenses, such as in cinematographic recording systems (e.g., CINEMASCOPE, PANAVISION, etc.). However, such cylindrical surfaces are difficult to make and test.

Currently, there are no practical optical systems useful in an aerospace environment which achieve (and thus employ) such anamorphism to maintain good ground resolution. By practical optical system, it is meant an optical system with a relatively large FOV (FOV greater than about 3 deg.) to be useful, an optical system that maintains good image quality over the entire FOV, an optical system that is all-reflective and present essentially no-sensing wavelength restrictions, or an optical system that provides 100% cold-shielding and thus allow the use of cold IR FPAs, or any combination of two or more thereof.

Therefore there is a need for anamorphic imaging systems that provide one or more of the above features.

SUMMARY

One or more embodiments of the present disclosure provide an optical system including a plurality of mirrors, each mirror having a rotational axis of symmetry; and a detector configured to detect an image formed by the plurality of mirrors. The plurality of mirrors are configured to scan an object space along a first direction. The plurality of mirrors are configured and arranged so that a focal length of the plurality of mirrors along the first direction is greater than a focal length of the plurality of mirrors in a second direction perpendicular to the first direction so as to obtain a ratio of anamorphism greater than approximately 1.5.

These and other features and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of this disclosure, the structural components illustrated herein are drawn to scale. It is to be expressly understood, however, that the drawings are for the purpose of illustration and description only and are not intended as a definition of the limits of the inventive concept. As used in the specification and in the claims, the singular form of "a", "an", and "the" include plural referents unless the context clearly dictates otherwise.

DETAILED DESCRIPTION

Figure 1A:
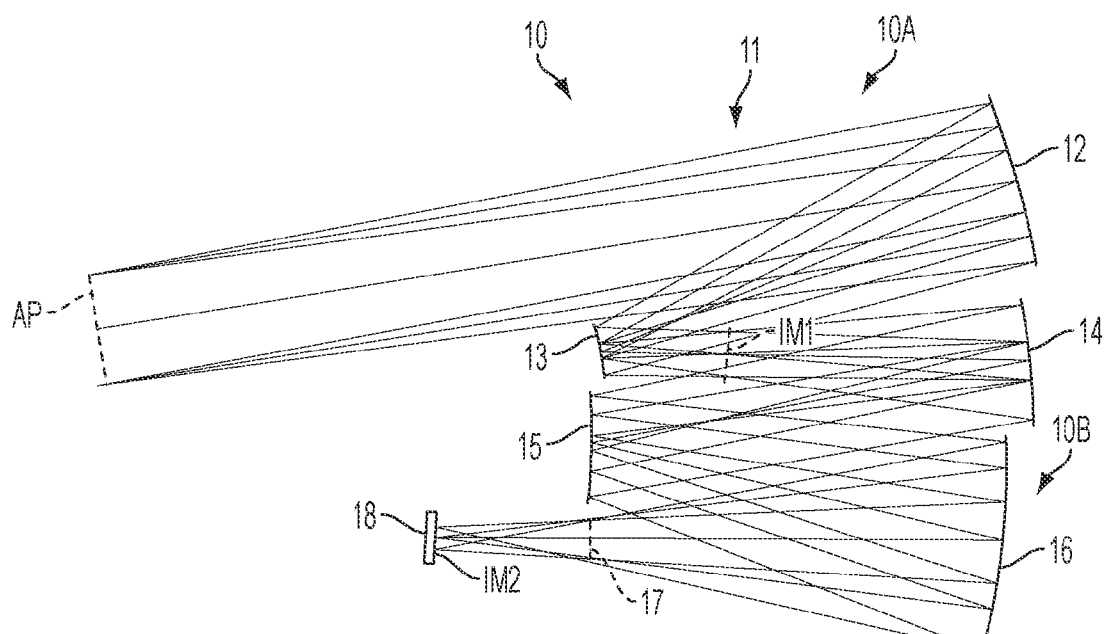
FIG. 1A is a lateral view of an optical system having anamorphism showing a ray-tracing simulation on the optical system, according to one embodiment.
Figure 1B:
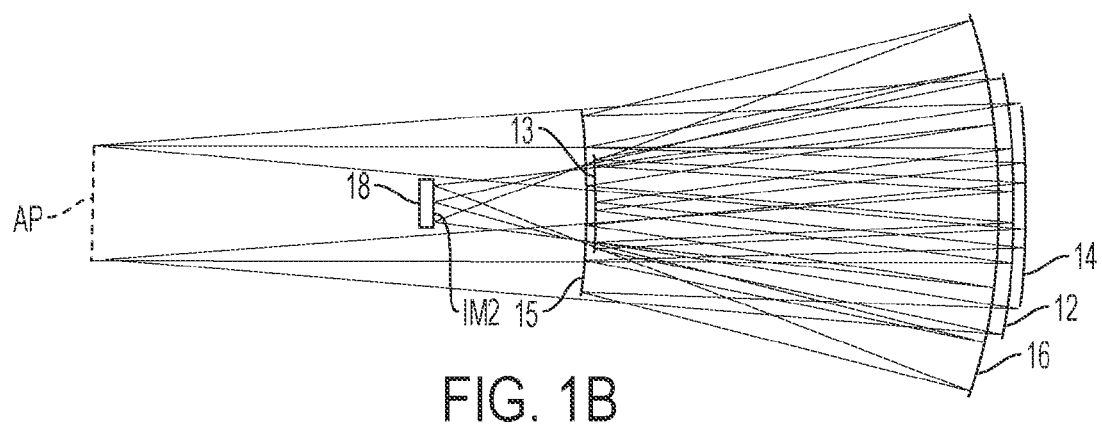
FIG. 1B is a top view of the optical system shown in FIG. 1A.

FIGS. 1A and 1B show a ray-tracing simulation on an optical system having anamorphism, according to one embodiment. FIG. 1A is a lateral view of the optical system and FIG. 1B is a top view of the optical system. Optical system 10 includes imaging optics 11 having mirrors 12, 13, 14, 15, and 16, and radiation detector or sensor 18 (e.g., FPA). In the embodiment shown in FIG. 1A, five mirrors are provided. However, any number of mirrors greater than three can be used. Mirrors 12, 13, 14, 15 and 16 can be attached to an optical bench structure to maintain a relative position between the various mirrors.

Radiation from an object at far field is collected by series of mirrors 12, 13, 14, 15 and 16 and directed onto detector or sensor 18. In one embodiment, first mirror 12 has a positive power, second mirror 13 has a negative power, third mirror 14 has a positive power, fourth mirror 15 has a negative power, and fifth mirror 16 has a positive power. Rays emitted by the object at far field are received by first mirror 12 which directs the rays onto second mirror 13. Second mirror 13 in turn reflects the rays towards third mirror 14 which directs the rays onto fourth mirror 15. Rays received by fourth mirror 15 are directed onto fifth mirror 16 which forms an image of the object on detector 18.

First mirror 12 and second mirror 13 cooperate to form an intermediate image IM1. A field stop may be located at a position of intermediate image IM1. First mirror 12 and second mirror 13 together function as or form multi-mirror reflective objective optical component 10A that forms intermediate image IM1. Although objective optical component 10A is shown having two mirrors, objective optical component 10A may comprise two or more mirrors.

Third mirror 14, fourth mirror 15 and fifth mirror 16 together function or form multi-mirror relay optical component 10B that relays the intermediate image IM1 to image IM2 on detector 18. Although relay optical component 10B is shown having 3 mirrors, relay optical component 10B can have one, two, three or more mirrors.

In one embodiment, a sum of the optical powers of all mirrors 12, 13, 14, 15 and 16 is substantially zero to satisfy the Petzval sum criterion. In one embodiment, a curvature of fifth mirror 16 can be selected so as to correct field curvature to achieve a substantially planar focal surface or near zero Petzval sum on detector 18. For example, by providing a substantially planar focal surface or near zero Petzval sum on the detector this allows to minimize optical aberrations.

Figure 2:
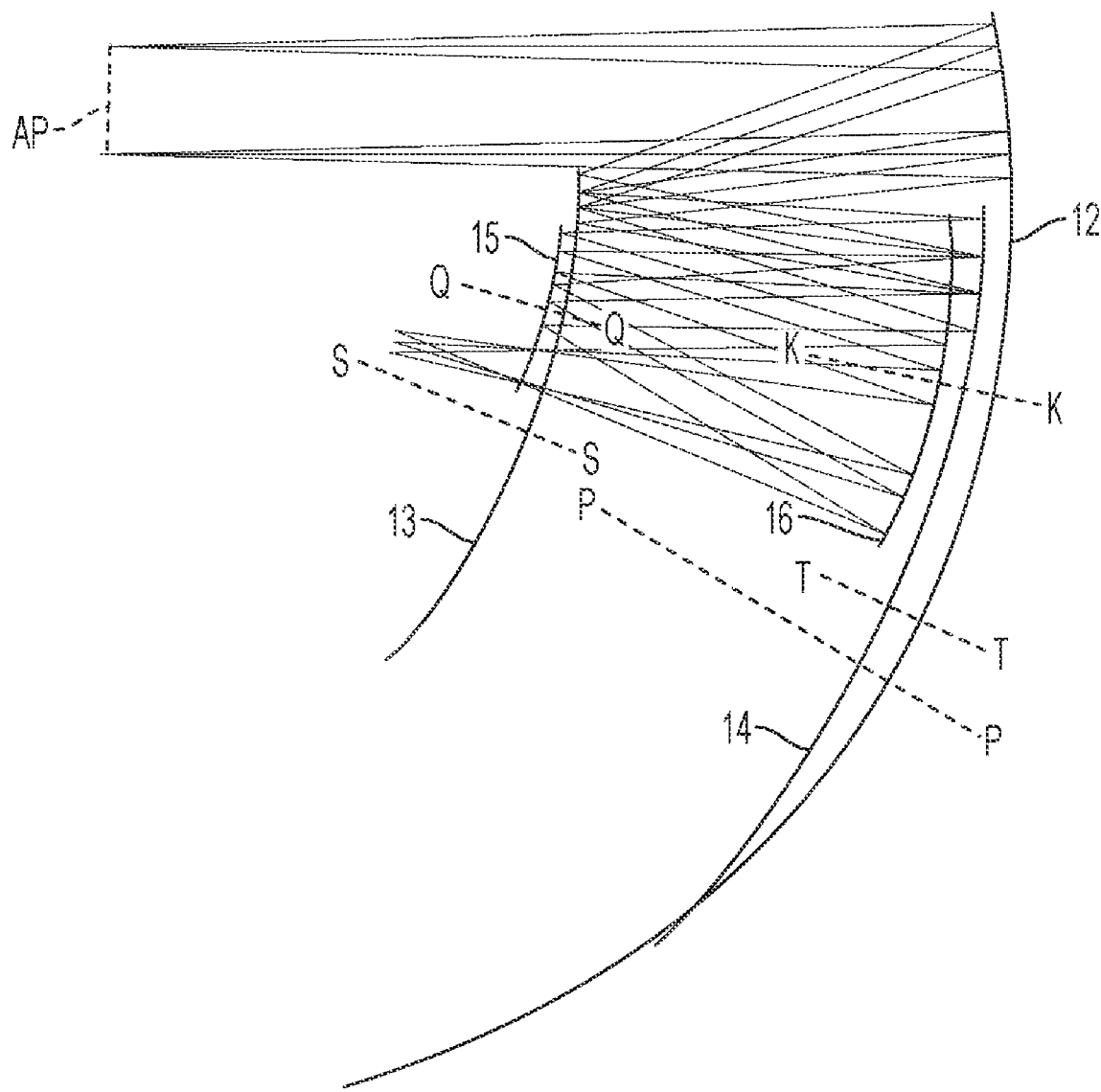
FIG. 2 depicts a relative position of mirrors of the optical system shown in FIGS. 1A and 1B, according to one embodiment.

In one embodiment, mirrors 12, 13, 14, 15 and 16 are tilted and decentered relative to each other so as to achieve a desired ratio of anamorphism (e.g., approximately a 2 to 1 ratio anamorphism). FIG. 2 depicts a relative position of mirrors 12, 13, 14, 15 and 16, according to one embodiment. As shown in FIG. 2, mirrors 12, 13, 14, 15 and 16 are decentered and tilted relative to each other. The various axes of rotation and symmetry are indicated in FIG. 2. The term axis of symmetry is used herein to signify that a rotation or a spin of a mirror around its axis of symmetry does not change a ray path of reflected rays from the mirror from one position to another rotated position of the mirror. First or primary mirror 12 has axis of rotation PP, second or secondary mirror 13 has axis of rotation SS, third or tertiary mirror 14 has axis of rotation TT, fourth or quaternary mirror 15 has axis of rotation QQ, and fifth or quinternary mirror 16 has axis of rotation KK. As shown in FIG. 2, the axes of symmetry PP, SS, TT, QQ and KK are shifted relative to each other. Furthermore, in one embodiment, the axes PP, SS, TT, QQ and KK are also angled relative to each other. For example, as shown in FIG. 2, axes PP and TT form an angle relative to each other. Axes PP and SS form also an angle relative to each other. In addition, as shown in FIG. 2, although axis SS and axis TT appear to be nearly collinear, these two axes also form an angle relative to each other albeit very small. Similarly, axes QQ and KK also appear to be nearly collinear. However, these two axes also form an angle relative to each albeit very small.

In one embodiment, the relative position of the various mirrors including the de-centering of the mirrors (i.e., centers of symmetry of the various mirrors are spaced apart from each other) and the tilting of the mirrors (i.e., the angle between the axes of symmetry of the various mirrors) allows to achieve a desired ratio of anamorphism.

In one embodiment, mirrors 12, 13, 14, 15 and 16 are positioned, oriented and tilted to achieve an approximately 2 to 1 ratio of anamorphism. In an approximately 2 to 1 ratio of anamorphism, a focal length of imaging optics 11 in a first direction (A-S direction) is approximately twice the focal length of imaging optics 11 in a second direction (C-S direction) perpendicular to the first direction.

In one embodiment, with optical system 10 having a 12 cm aperture, a focal length of imaging optics 11 including mirrors 12, 13, 14, 15 and 16 in the A-S direction is approximately 47.6 cm for a speed of F/3.97. On the other hand, a focal length of imaging optics 11 in the C-S direction is approximately 24.75 cm. In this embodiment, a speed of optical system 10 is approximately F/2.06. The FOV of optical system 10 is 3 deg. in the A-S direction by 9 deg. in the C-S direction.

in one embodiment, an average 80% geometrical blur diameter containing 80% of rays is approximately 21.6 μm across the FOV. A resulting root mean square of wave front error (RMS WFE) (e.g., at the wavelength centered around 3 μm) averaged over the FOV is approximately 0.233 μm. In one embodiment, an RMS WFE value or range of values and/or the an average geometrical blur diameter define the image quality of an optical system at a certain radiation wavelength or in a certain range of radiation wavelengths. These values of the blur diameter and RMS WFE indicate a good image quality can be achieved using optical system 10.

Optical system 10 has a real entrance pupil at AP and forms a reimaged stop 17 between mirror 16 and image plane IM2 on detector 18. A reimaged stop is an optical stop, real or virtual, that provides reduced amount of flare caused by ray diffraction at other optical elements (e.g., at mirrors 13, 14, 15 and/or 16). In one embodiment, a pupil magnification is about 3.0 times in the A-S plane (in the A-S direction) and about 1.5 times in the C-S plane (in the C-S direction).

In the process of creating a ratio of approximately 2 to 1 (e.g., 1.92) anamorphism, about $\sqrt{2}$ to 1 ratio anamorphism is achieved in the objective component 10A (formed by first mirror 12 and second mirror 13) of imaging optics 11, and about to 1 ratio anamorphism is achieved in the relay component 10B (formed by third mirror 14, fourth mirror 15 and fifth mirror 16).

Figure 3:
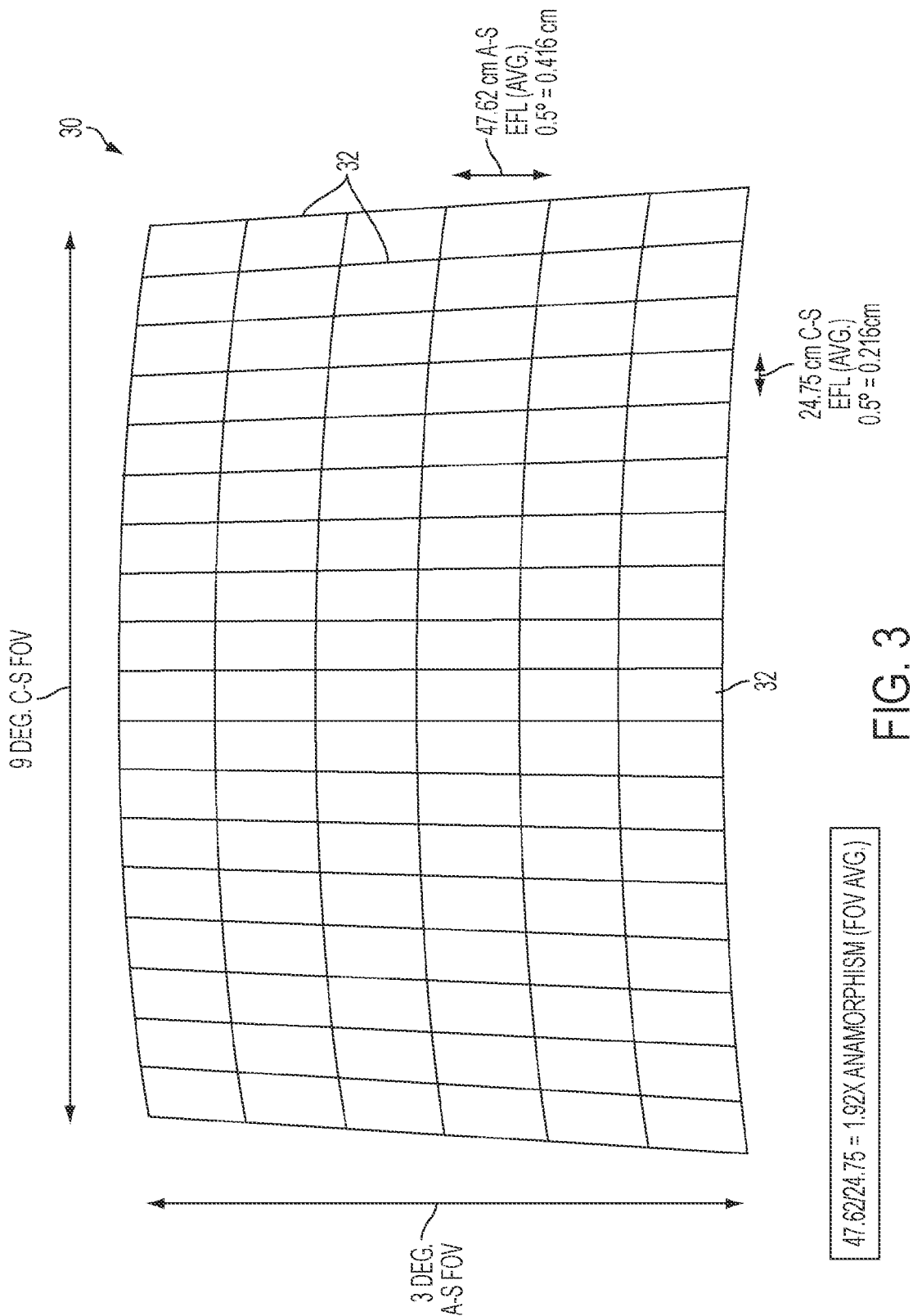
FIG. 3 depicts a schematic representation of an image grid of 0.5 deg. by 0.5 deg. squares GSD in object space obtained using the optical system shown in FIGS. 1A, 1B and 2, according to one embodiment.

FIG. 3 depicts a schematic representation of an image grid 30 of 0.5 deg. by 0.5 deg. squares GSD 32 in object space, according to one embodiment. As shown in FIG. 3, the whole image grid 30 is covered by a FOV of the optical system 10. In one embodiment, the FOV of optical system 10 is approximately 9 deg. in the C-S direction and approximately 3 deg. in the A-S direction. In one embodiment, an effective focal length of optical system 10 in the A-S direction is approximately 47.62 cm and an effective focal length of optical system 10 in the C-S direction is approximately 24.75 cm. As a result, a ratio of approximately 2 to 1 anamorphism is achieved. Specifically, a 1.92 (47.62 cm/24.75 cm) anamorphism is achieved. In one embodiment, a 0.5 deg. GSD in object space provides an imaging resolution of approximately 0.416 cm in the A-S direction on detector (e.g., FPA) 18, and 0.5 deg. GSD in object space provides an imaging resolution of approximately 0.216 in the C-S direction on detector (e.g., FPA) 18.

A speed of optical system 10 in the A-S direction can be calculated by dividing the effective focal length in the A-S direction by a dimension (e.g., diameter) of the aperture AP. In the above example, by dividing the effective focal length of approximately 47.62 cm in the A-S direction by the aperture AP of about 12 cm, the speed of the optical system in the A-S direction is approximately F/3.97. Similarly, a speed of optical system 10 in the C-S direction can be calculated by dividing the effective focal length in the C-S direction by a dimension (e.g., diameter) of the aperture AP. In the above example, by dividing the effective focal length of approximately 24.75 cm in the C-S direction by the aperture AP of about 12 cm, the speed of the optical system in the C-S direction is approximately F/2.06.

A specific prescription for an embodiment of the optical system illustrated in FIGS. 1A, 1B and 2 is given in TABLE 1.

TABLE I

| Surf. | Decrip. | Rd | CC | Ad | Ae | Af | Ag | Yd | Alpha | Thk | Matl. |
|---|---|---|---|---|---|---|---|---|---|---|---|
| 1 | Ent. Pupil (AP) | inf. | | | | | | 28.864 | 10.088 | 96.3151 | Air |
| 2 | Pint | −93.0216 | −0.233173 | 7.312E−08 | −2.528E−12 | −6.206E−16 | 1.180E−19 | −19.8645 | −21.0098 | −44.3691 | Refl |
| 3 | Sec. | −184.502 | 27.9059 | −2.867E−06 | −1.485E−09 | 1.157E−12 | 7.284E−16 | 0.4855 | −11.3941 | 15.3406 | Refl |
| 4 | Int. image (IM1) | inf. | | | | | | | | 27.7325 | Air |
| 5 | Third | −140.467 | 4.910178 | 9.090E−08 | −4.418E−11 | 2.787E−15 | 9.392E−18 | −11.4946 | −13.9364 | −43.1014 | Refl |
| 6 | Fourth | −71.0819 | 7.013669 | −2.153E−07 | 1.513E−09 | −3.821E−12 | 1.206E−14 | 14.4209 | −4.7266 | 44.1989 | Refl |
| 7 | Fifth | −66.2402 | 0.160633 | −1.628E−09 | −2.090E−11 | 4.388E−14 | −3.501E−17 | 13.5905 | −1.8471 | −45.0393 | Refl |
| 8 | Stop | inf. | | | | | | 7.882 | | −15.2998 | Air |
| 9 | Image (IM2) | inf. | | | | | | 8.025 | | n/a | n/a |

In Table 1 are listed the various optical surfaces of optical system 10 and their respective radii of curvature (Rd), conic constants (CC), aspheric coefficients (Ad), (Ae), (Af), (Ag), decenter (Yd), tilt Alpha, and thickness (Thk), and type of material (Matl) when applicable. For example, surfaces 2, 3, 5, 6 and 7 correspond to first, second, third, fourth and fifth mirrors 12, 13, 14, 15 and 16, respectively. Surfaces 4 and 9 correspond respectively to images IM1 and IM2, respectively. Surface 1 corresponds to entrance pupil or aperture AP, and surface 8 corresponds to the reimaged stop 17.

In this optical prescription, optical system 10 has an entrance pupil diameter of approximately 12 cm, a stop size of approximately 3.8 cm in the C-S direction by 7.8 cm in the A-S direction decentered by approximately 7.88 cm. Additionally, the average effective focal length in the A-S direction is approximately 47.74 cm and the average focal length in the C-S direction is approximately 24.48 cm. The average F-number in the A-S direction is approximately F/3.98 and the average F-number in the C-S direction is approximately F/2.04. The FOV in the A-S direction is about 3.0 deg. and 9.0 deg. in the C-S direction. Additionally, it can be shown by accurate raytracing that aberrations of all types, both monochromatic and polychromatic, are suitably small, so as to render the optical design image quality diffraction limited in the SWIR, MWIR and LWIR wavelength bands.

Although in the above embodiments optical system 10 is described as having approximately a 2 to 1 ratio of anamorphism, as it can be appreciated, optical system 10 can be designed and configured to achieve any desired ratio of anamorphism. For example, a 1.5 factor of anamorphism or greater can be achieved.

It should be appreciated that in one embodiment, the drawings herein are drawn to scale (e.g., in correct proportion). However, it should also be appreciated that other proportions of parts may be employed in other embodiments.

Although the inventive concept has been described in detail for the purpose of illustration based on various embodiments, it is to be understood that such detail is solely for that purpose and that the inventive concept is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Furthermore, since numerous modifications and changes will readily occur to those with skill in the art, it is not desired to limit the inventive concept to the exact construction and operation described herein. Accordingly, all suitable modifications and equivalents should be considered as falling within the spirit and scope of the present disclosure.

What is claimed is:

1. An optical system, comprising:
a plurality of mirrors, each mirror having a rotational axis of symmetry; and
a detector configured to detect an image formed by the plurality of mirrors,
wherein the plurality of mirrors are configured to scan an object space along a first direction, wherein the plurality of mirrors are configured and arranged so that a focal length of the plurality of mirrors along the first direction is greater than a focal length of the plurality of mirrors in a second direction perpendicular to the first direction so as to obtain a ratio of anamorphism greater than approximately 1.5.

2. The optical system of claim 1, wherein the ratio of anamorphism is approximately 2 to 1.

3. The optical system of claim 1, wherein the focal length of the plurality of mirrors along the first direction is approximately twice the focal length of the plurality of mirrors in the second direction.

4. The optical system of claim 1, wherein the detector comprises a focal plane array sensor having an array of radiation sensing pixels.

5. The optical system of claim 1, wherein the plurality of mirrors include a first mirror and a second mirror forming a reflective objective optical component of the optical system, the first mirror and the second mirror being configured to form an intermediate image.

6. The optical system of claim 5, wherein the reflective objective optical component achieves approximately $\sqrt{2}$ to 1 ratio of anamorphism.

7. The optical system of claim 5, wherein the plurality of mirrors further include a third mirror, a fourth mirror and a fifth mirror forming a relay optical component of the optical system, the third mirror, the fourth mirror and the fifth mirror being configured to relay the intermediate image to the image on the detector.

8. The optical system of claim 7, wherein the relay optical component achieves Approximately √2 to 1 ratio of anamorphism.

9. The optical system of claim 1, wherein the plurality of mirrors are tilted and decentered relative to each other so as to achieve a desired ratio of anamorphism.

10. The optical system of claim 1, wherein the rotational axis of symmetry of each mirror forms an angle with respect to a rotational axis of symmetry of another mirror so that the plurality of mirrors are tilted relative to each other so as to achieve said desired ratio of anamorphism.

11. The optical system of claim 10, wherein a center of symmetry of each mirror is spaced apart from a center of symmetry of another mirror so that the plurality of mirrors a de-centered relative to each other to achieve said desired ratio of anamorphism.

12. The optical system of claim 1, wherein the focal length of the plurality of mirrors in the first direction is approximately 47.6 cm and the focal length of the plurality of mirrors in the second direction is approximately 24.75 cm.

13. The optical system of claim 1, wherein a speed of the optical system is approximately F/3.97 in the first direction and approximately F/2.06 in the second direction.

14. The optical system of claim 1, wherein a field of view of the optical system is approximately 3 deg. in the first direction and 9 deg. in the second direction.

15. The optical system of claim 1, wherein an average geometrical blur diameter is approximately 21.61 μm across a field of view of the optical system.

16. The optical system of claim 1, wherein a root mean square wave front error averaged over a field of view of the optical system is approximately 0.233 μm.

17. The optical system of claim 1, wherein a pupil magnification of the optical system is approximately three times in the first direction and about 1.5 times in the second direction to achieve a ratio of approximately 2 to 1 of anamorphism.

* * * * *